Sept. 16, 1969  J. MARCOVITCH  3,466,912
MANUFACTURE OF ANNULAR ARTICLES
Filed May 1, 1967  4 Sheets-Sheet 1

INVENTOR
JACOB MARCOVITCH
BY Young + Thompson
ATTYS.

Sept. 16, 1969  J. MARCOVITCH  3,466,912
MANUFACTURE OF ANNULAR ARTICLES
Filed May 1, 1967  4 Sheets-Sheet 2
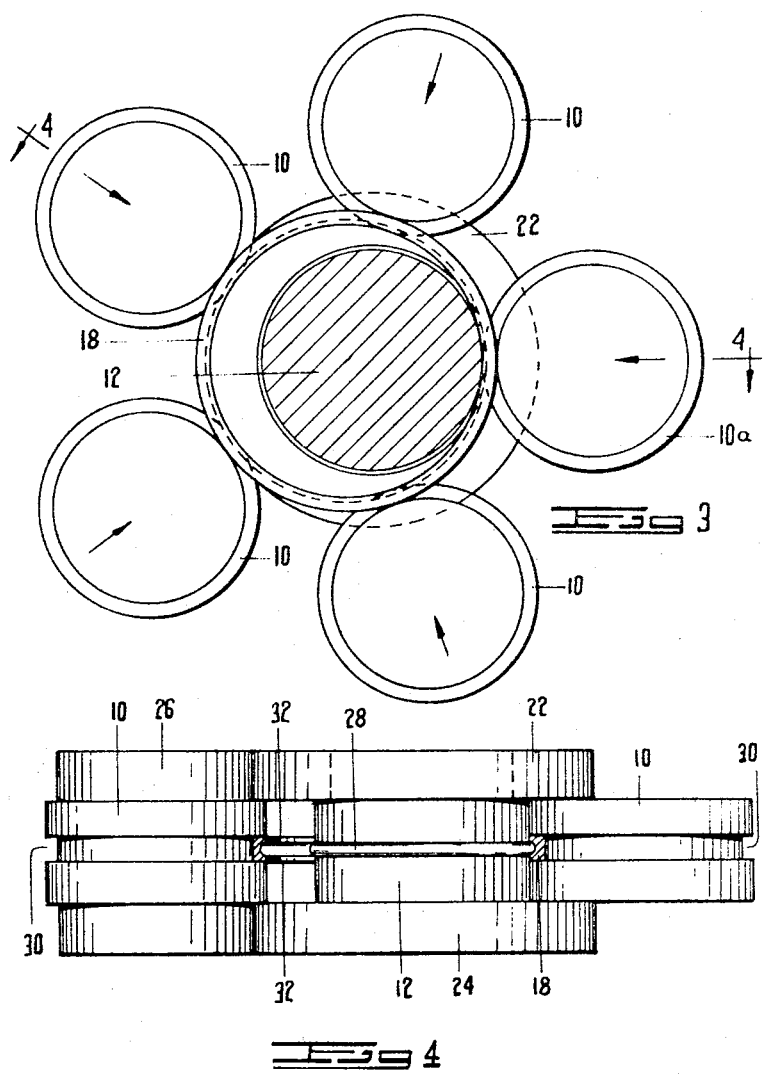

Sept. 16, 1969   J. MARCOVITCH   3,466,912
MANUFACTURE OF ANNULAR ARTICLES
Filed May 1, 1967   4 Sheets-Sheet 3
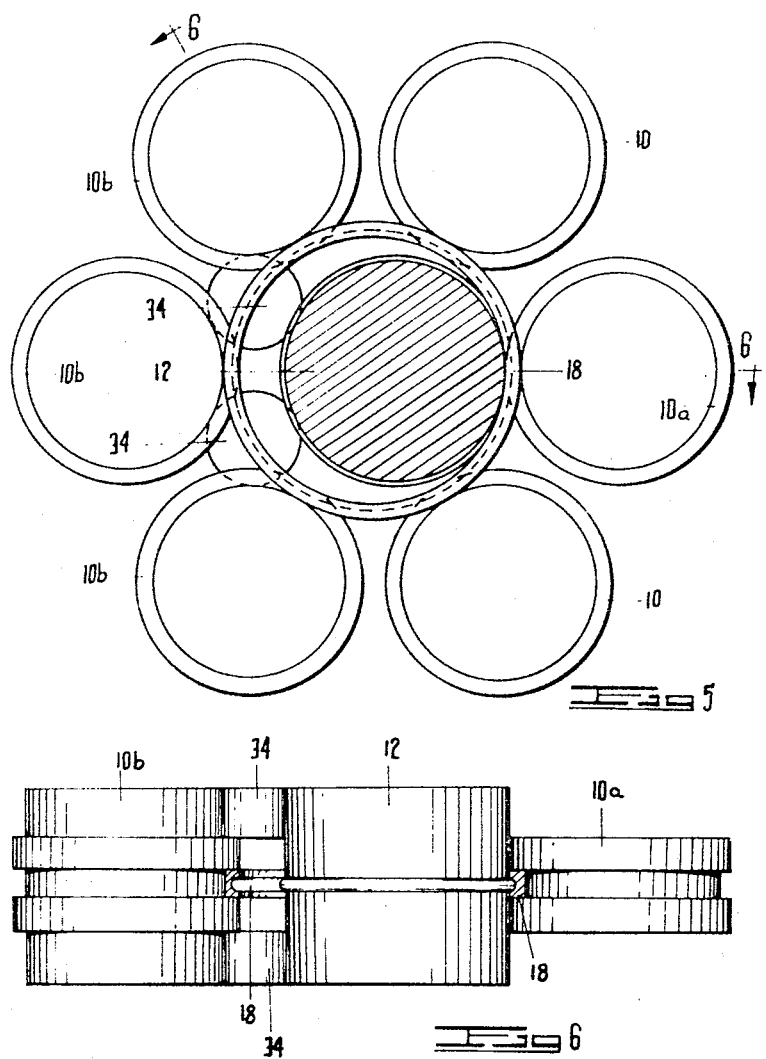
INVENTOR
JACOB MARCOVITCH
BY Young & Thompson
ATTYS.

Sept. 16, 1969　　　　J. MARCOVITCH　　　　3,466,912
MANUFACTURE OF ANNULAR ARTICLES

Filed May 1, 1967　　　　　　　　　　　　　　4 Sheets-Sheet 4

INVENTOR
JACOB MARCOVITCH
By Young & Thompson
ATTYS.

United States Patent Office 3,466,912
Patented Sept. 16, 1969

3,466,912
MANUFACTURE OF ANNULAR ARTICLES
Jacob Marcovitch, Johannesburg, Republic of South Africa, assignor to Rotary Profile Anstalt, Vaduz, Liechtenstein
Filed May 1, 1967, Ser. No. 634,941
Claims priority, application Republic of South Africa, May 5, 1966, 66/2,611; Apr. 19, 1967, 67/2,272
Int. Cl. B21d *15/00*
U.S. Cl. 72—110                                    8 Claims

ABSTRACT OF THE DISCLOSURE

Rings are profiled by contacting the surface of an annular blank by at least three rollers that are moved radially inwardly to diminish the diameter until the required outer diameter is reached. The blank may be squeezed between a mandrel and one or more of the series of rollers the inward movement of which is arrested when they define a circle of diameter equal to the required ring diameter. Some of the series of rollers may be mounted on a holder and the rest on a base, the holder and base being moved together until they make contact, when the rollers are in their final position.

---

Figure 1:
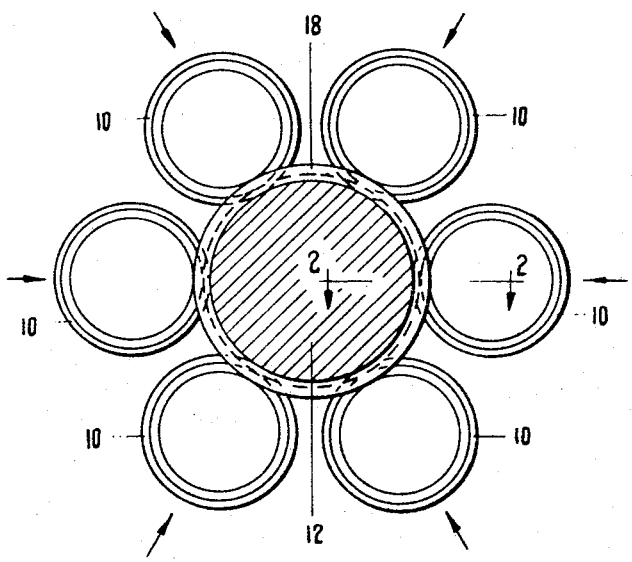

This invention relates to the manufacture of rings by inserting a cylindrical mandrel into the cavity of an annular blank and squeezing the blank between the mandrel and an opposed surface such as a roller, while causing the blank to rotate about its axis by rotating the mandrel. During the rotation of the blank, it may be profiled on its inner or outer surface, or both, to conform with the contour of the mandrel or of the roller surface.

While many machines of the general nature outlined above have been proposed by previous workers in the field, there has been none, to the applicant's knowledge, which produces rings the inner and outer diameters of which are consistent, so that the process has not been usable in respect of articles, such as the races of rolling bearings, which must be consistently precise. It is the object of this invention to provide machines which are capable of producing such rings, and also rings in which both the diameters and the width are consistently precise.

According to the invention, the blank is contacted extremely by at least three relatively rotating rollers spaced around its circumference and internally by a mandrel, at least one of the rollers providing a surface against which the blank is squeezed by the mandrel.

Within the broad concept set out in the last preceding paragraph, are encompassed two main species viz one in which the mandrel is a sufficiently loose fit to be insertable into the cavity of the blank but in which the finished article so tightly encloses the mandrel that force must be used to force them apart; and one in which the mandrel is a sufficiently loose fit within the blank to be freely removable from the finished article.

With regard to the first group, the series of rollers are movable relatively inwardly by coordinated means that limit the convergent movement of the rollers and ensure that the points of contact of the rollers on the circumference of the blank lie on the circumference of a circle the diameter of which is that prescribed for the outer diameter of the article. The rollers may be driven, or some of them may be, or, if there is a mandrel, it may be the mandrel that is driven, the rollers rotating by frictional engagement with the workpiece, which is itself driven by the mandrel. However, as the frictional drive between the mandrel and the workpiece is uncertain, it is preferred that each roller is driven. The peripheral speeds of the rollers must be the same, and it is also preferred that the rollers be of equal diameter.

As the rollers rotate and simultaneously apply radially inward pressure to the blank around its circumference, their rotation is transmitted to the blank, which is plastically deformed to a decreased outer diameter. The inner diameter is dictated by the mandrel. When the workpiece collapses upon the mandrel, further decrease in outer diameter is possible as the rollers converge, the plastic flow causing increase in the width of the ring, until the point of maximum convergence is reached and the ultimate outer diameter of the ring achieved.

The lateral spread of the ring may also be limited by stop surfaces. Conveniently the mandrel is circumferentially grooved and the blank is located within the groove when the machine is charged. As the rollers converge, they, or one or some of them, enter the groove, to confine the blank in all three dimensions. As blank sizes must perforce vary somewhat, an annular escape gap is provided at one or other side of the groove, into which surplus material is extruded to form a flash which is machined off in a subsequent operation.

The means to dictate the maximum convergence of the rollers consist preferably of stop surfaces, which, in the first group, preferably are the mandrel and the rollers, that physically prevent further convergence once the stop surfaces have come into contact with one another. One such arrangement consists of heads on the mandrel ends, at least one of which is of greater diameter than the effective zone of the mandrel which is in contact with the blank, and lands on the rollers which are juxtaposed to the heads and which come into contact with the heads to limit the convergence. To demount the finished article, one of the heads must be made removable, if they are both of greater diameter than the diameter of the effective zone of the mandrel.

On the subject of demounting, it will be apparent in the first group that the radially inward deforming pressure applied to the blank will cause the finished article tightly to enclose the mandrel. This has the consequence that the article must have an inner surface which permits demounting, that is to say a cylindrical surface or a stepped or tapering surface. With such a surface, demounting is not difficult, preferably by a hydraulic ram. Demounting may be aided by initial oiling of the inner surface of the blank.

The rollers being displaceable, there is no limit to the profile that can be imposed on the outer surface of the blank. Such profile may be imposed by one or some of the rollers only, the others being cylindrical; but preferably all rollers are identical, so that the profile rolled into the blank by one is followed by its successors.

The first group described above is suitable for the fabrication of articles like the inner races of rolling bearings, the mandrel prescribing the bore of the bearing and the rollers profiling the outer face to receive the balls or rollers. If the bore is not to be cylindrical or tapered or stepped, the other group of machines is required.

In the second group, the mandrel is loose in the blank and remains so, so that it can easily be extracted whatever profile it has rolled into the inner surface of the ring. The mandrel presses the blank against some, and preferably one only, of the rollers. The movement imparted to the mandrel may result from contact of the mandrel axle with one or more of the rollers which is or are caused to move inwardly to impart the motion to the mandrel. If this arrangement is used then the other rollers are arranged to move inwardly also, in unison so that their tangent points with the workpiece always lie on a perfect circle. The only permissible exception is a single roller, preferably that against which the mandrel is pressed, that may be mounted on a fixed axis.

It is pointed out that, in both embodiments, the peripheral rollers fulfill two functions. They act, first of all, to limit diametral spread, so that they are an alternative to a control ring which surrounds the blank and into which the blank is expanded by the profiling operation. The arrangement is, however, advantageous, in that demounting from the control ring is avoided.

The second function is the active one of shaping the outer surface of the article. This shaping, as has been observed above, may be the formation of a profile, such as the ball-containing groove of an inner race for a ball bearing, or it may be a finishing operation to polish and perfect a plain cylindrical or tapered face. This profiling function could be associated with a general reduction in outside diameter of the blank before, simultaneously, or after the functioning of the mandrel, so that, all in all, a blank could be profiled within or without, and its diametral dimensions increased or decreased as a matter of choice.

The embodiments of the invention call for a multiplicity of peripheral rollers, that is to say three or more, and it would usually if not invariably be more than three. When the geometry of the arrangement is examined, it is apparent that the more points of support that can be provided around the periphery of the blank, the more nearly do the rollers approach a control ring surrounding the blank and the less chance is there that the ring will deviate from circularity by reason of the angular extent of the unsupported arcs of the periphery of the ring between pairs of rollers. The extent to which the periphery of the ring must be supported is bound up with the factors of rate of inward feed of the rollers rate of advance of the mandrel (if there be a mandrel and independent mandrel-displacing means be provided, otherwise, the rate of advance is dependent on the rate of feed of the rollers), peripheral speed of the blank, diameter and wall thickness of the blank, and the nature of its material, particularly its plasticity. While no definite formula correlating these factors has been evolved, the necessary parameters for success are ascertainable by simple experiment, given the material and size of the finished article and the number of rollers. However, the following examples are given as an indication to enable successful rolling to proceed, beyond which the rolling process breaks down and terminates prematurely.

Using 2 driven rollers of 13" diameter, rotating at 23 r.p.m., with their axes fixed, and a third idling roller of 12" diameter, force-fed towards the fixed rollers, defining between them a triangular space to contain a workpiece, and with plain surfaces on the rollers, the following results were obtained with mild steel of .1% carbon (EN1A) at ambient temperature:

(1) A blank of 2.46" outside diameter and 7/16" wall thickness was successfully reduced in outside and inside diameter with feeds up to 15 secs./inch travel. With faster feeds the rolling broke down.

(2) Using blanks of the same constant outside diameter, and reducing wall thickness and rate of feed, it was found, at 40 secs. per inch feed and at a wall thickness of less than 5/16", that the blank began to lose circularity although the breakdown of rolling was not as marked in the thicker workpiece with increasing feeds.

These examples were actually carried out without a mandrel, but would be also valid for the two groups described above using a mandrel.

Figure 2:
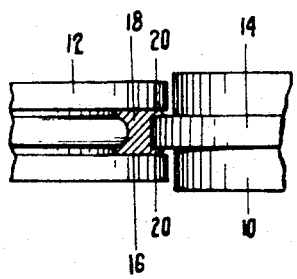
Figure 7:
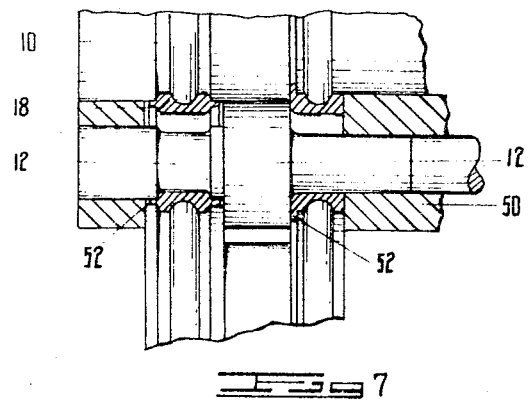
Figures 8, 9, 10:
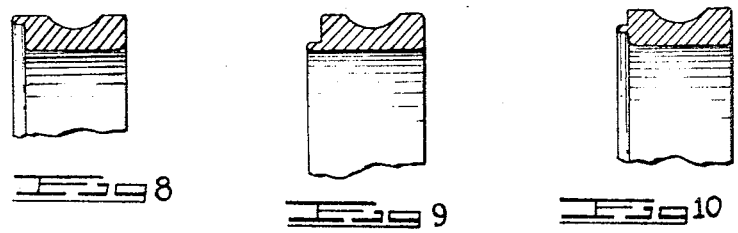
Figures 11, 12:
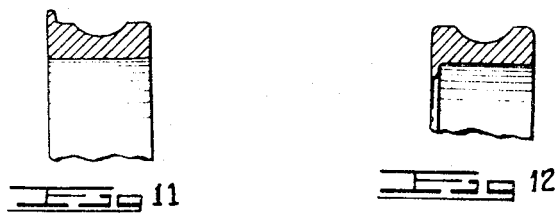

Schematic arrangements of various embodiments described are in the accompanying drawings, in which:

FIGURE 1 is a side view, partly sectioned, of a machine of the first group,

FIGURE 2 is a fragmentary view of a part of the ring at the conclusion of profiling, FIGURE 3 is a side view, partly in section, of a machine of the second group, FIGURE 4 is a plan view, partly sectioned, of the machine of FIGURE 3, FIGURES 5 and 6 are views, similar to FIGURES 3 and 4, of a modified machine of the second group, FIGURE 7 is a fragmentary view, partly in section, of a machine with a multiple mandrel, and FIGURES 8 to 12 are cross-sections of workpieces produced by a machine similar to that of FIGURE 8.

In FIGURE 1, which is an example of a group one machine, the rollers 10 are moved radially inwardly to diminish the diameter of an annular blank 18. As they converge, the rollers, one or some of them, is or are rotated, which imposes rotation on the blank which in turn may impose rotation on a non-driven roller or rollers.

The number of rollers, the rate of inward feed, and the speed of rotation, depend upon the nature and dimensions of the blank being treated. The permissible extent of the unsupported arcs between adjacent rollers is obviously critical. If the arcs are too big, the workpiece may buckle instead of remaining circular. Even if they are small, an exaggerated rate of inward feed may cause buckling. No formula can be laid down, but for any given blank the necessary parameters are readily ascertainable by a few simple experiments. Once the parameters have been established, inward movement of the rollers produces smoothly progressive diminution of diameter without bulge, and concludes with a finished article of acceptable circularity.

All the rollers 10 are movable inwardly in unison. As will be seen in FIGURE 2, the roller 10 has a rib 14, which projects into circumferential recesses 16 in the mandrel 12 and closes off the recesses so that the blank 18 is entrapped. The width of the recess defines the width of the finished ring, and it will be noticed that there are escape gaps 20 between the recess and the rib to receive surplus material. The thickness of the finished ring is dictated by contact between the rollers and the mandrel, which stops further radially inward movement of the rollers.

In FIGURES 3 and 4, all rollers 10 are movable inwardly, although the roller 10a against which the mandrel 12 bears could be fixed. The mandrel has a removable head 22 at one side and a fixed head 24 at the other, against which lands 26 of the rollers 10 bear. Inward movement of the rollers 10 is transmitted by way of the lands and the heads to the mandrel 12 which presses the blank 18 against the roller 10a. The mandrel is profiled at 28 to impress a peripheral groove into the blank, and the rollers 10 are recessed at 32 to contain the blank 18. There are annular escape gaps 32 as in FIGURE 2. Any suitable means is provided to move the rollers inwardly and outwardly in unison, and to limit the inward movement, and one such is shown in FIGURES 7 and 8.

The arrangement of FIGURES 5 and 6 enables the provision of a removable head on the mandrel like that numbered 22 in FIGURE 4, to be avoided. The rollers 10b propel intermediate rollers 34 against the lands of the mandrel 12 to advance it. The intermediate rollers 34 may be idlers.

The mandrel may be used to form a number of articles simultaneously as has been seen in FIGURE 7, the rollers being correspondingly shaped. In FIGURE 7, the mandrel 12 is shown as multiple, with its parts detachably connected together end to end by sleeves 50. The arrangement shows also the annular escape gaps 52 as seen in the cross-sections of finished rings in FIGURES 9 to 13, which may be variously located.

From what has been said, it will be apparent that the invention offers the possibility of high-speed mass production of rings, profiled on the inner face, or the outer face, or both, with precise diametral and lateral dimensions. The finish obtainable is of high standards and, if no heat-treatment is necessary which will cause warping, the finished articles may require nothing more than the removal of the extruded flash. When heat-treatment is necessary, the initial accuracy of the workpieces ensures that the minimum machining after heat-treatment will be necessary. All of these benefits are obtainable with no wastage of material at all, except for the flash. However, if blanks of consistent mass or volume could be provided, even this wastage could be made to approach zero.

It will be noted that the rollers 10 always bear on the circumference of the blank, i.e. a circle can be drawn which is tangential to all the rollers with the rollers lying outside this circle.

I claim:
1. A method of diminishing the outside diameter of an annular blank, comprising contacting the external surface of the blank with a main roller and a plurality of additional rollers, the rollers being substantially equi-spaced around the circumference of the blank in such manner that a circle can be drawn which is tangential to all the rollers; supporting the blank over its entire axial length at least opposite the main roller by a mandrel; rotating at least one of the rollers to impose rotation on the blank and any non-driven roller; and moving the rollers relatively to each other so that they move radially inwardly relatively to the blank and thereby diminish its outside diameter always maintaining their relationship tangential to a circle of decreasing diameter; and continuing the operation until the required final outside diameter of the blank is reached.

2. The method of claim 1 in which the rollers are moved radially inwardly relatively to the blank to deform the blank into close contact with the entire periphery of the mandrel; and thereafter withdrawing the mandrel from the finished ring.

3. Apparatus for rolling rings comprising a main roller; a plurality of additional rollers, the rollers being arranged so that a circle can be drawn which is tangential to all the rollers with the rollers substantially equi-spaced about the circle and outside which circle lie the axes of the rollers; a mandrel located within the circle opposite the main roller so as to support a workpiece over its entire axial length at least where the main roller acts on the workpiece, the rollers being movable relatively to each other in such manner that they maintain their tangential relationship to a circle which is of different diameter to the first mentioned circle.

4. Apparatus as claimed in claim 3 in which the working surfaces of the rollers are profiled and in which the mandrel has a recess into which a workpiece is received.

5. Apparatus as claimed in claim 3 in which the outside surface of the mandrel is profiled and in which the rollers are provided with peripheral recesses in which a workpiece is received.

6. Apparatus as claimed in claim 3 in which the movable rollers are movable relative to the mandrel.

7. Apparatus as claimed in claim 3 in which the mandrel has removably attached to one end thereof a head having an enlarged diameter relative to the mandrel.

8. Apparatus as claimed in claim 3 comprising at least four additional rollers in which at least two additional rollers located remote from the main roller have enlarged heads which bear against the mandrel to support the mandrel.

References Cited
UNITED STATES PATENTS

| | | | |
|---|---|---|---|
| 3,230,606 | 1/1966 | Tadashi Saito et al. | 72—108 |
| 3,299,680 | 1/1967 | Thompson | 72—82 |

CHARLES W. LANHAM, Primary Examiner

LOWELL A. LARSON, Assistant Examiner